(12) United States Patent
Abbott, III

(10) Patent No.: US 11,820,612 B2
(45) Date of Patent: *Nov. 21, 2023

(54) METHODS AND SYSTEMS FOR LIFTING, LEVELING AND LOADING MATERIAL INTO A CONTAINER

(71) Applicant: Robert T. Abbott, III, Towaco, NJ (US)

(72) Inventor: Robert T. Abbott, III, Towaco, NJ (US)

(73) Assignee: JDV Equipment Corporation, Dover, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/320,087

(22) Filed: May 13, 2021

(65) Prior Publication Data
US 2021/0261362 A1    Aug. 26, 2021

Related U.S. Application Data

(63) Continuation of application No. 16/373,202, filed on Apr. 2, 2019, now Pat. No. 11,014,769.

(60) Provisional application No. 62/651,672, filed on Apr. 2, 2018.

(51) Int. Cl.
*B65G 67/22* (2006.01)
*B65G 69/04* (2006.01)

(52) U.S. Cl.
CPC ......... *B65G 67/22* (2013.01); *B65G 69/0458* (2013.01)

(58) Field of Classification Search
CPC . B65G 69/0433; B65G 69/0458; B65G 67/04
See application file for complete search history.

(56) References Cited

U.S. PATENT DOCUMENTS

| | | |
|---|---|---|
| 3,633,776 A | 1/1972 | Moore |
| 4,012,160 A | 3/1977 | Parker |
| 4,466,509 A | 8/1984 | Kishi |
| 5,299,906 A | 4/1994 | Stone |
| 5,417,540 A | 5/1995 | Cox |
| 5,427,497 A | 6/1995 | Dillman |
| 5,536,131 A | 7/1996 | Behr |
| 5,810,544 A | 9/1998 | Wellman |
| 6,367,377 B1 | 4/2002 | Gawley et al. |
| 6,709,219 B2 | 3/2004 | Reed, III |

(Continued)

OTHER PUBLICATIONS

Freight Lift; 4-Post Mechanical Freight Lift for Safe, Reliable, High Capacity Load Transfer Between Multiple Levels; Retrieved from: https://www.autoquip.com/products/high-travel-lifts/mechanical-4-post-vrc; Autoquip; Nov. 10, 2017.

(Continued)

*Primary Examiner* — Saul Rodriguez
*Assistant Examiner* — Willie W Berry, Jr.
(74) *Attorney, Agent, or Firm* — POLSINELLI PC

(57) ABSTRACT

An overhead material handling system is provided. The system comprises a leveler having a cover defining an interior, and a screw having a shaft and a screw portion positioned within the cover interior. The system further comprises a lift structure comprising a plurality of hydraulic stabilizing legs, the lift structure being connected to the leveler wherein the plurality of hydraulic legs extend and retract to raise and lower the lift structure, at least one sensor, and a safety mechanism comprising at least one extension off of an end of the leveler.

17 Claims, 6 Drawing Sheets

(56) References Cited

U.S. PATENT DOCUMENTS

| | | |
|---|---|---|
| 7,537,426 B1 | 5/2009 | Dunn |
| 7,712,583 B2 | 5/2010 | Matsumoto |
| 2006/0226612 A1 | 10/2006 | Smith et al. |
| 2008/0203097 A1 | 8/2008 | Cardoso Cabral Martins da Silva et al. |
| 2010/0215466 A1 | 8/2010 | Cline |
| 2014/0083561 A1 | 3/2014 | Abbott |
| 2015/0078832 A1 | 3/2015 | Kline |

OTHER PUBLICATIONS

Hydrostatic level; Hydrostatic level measurement; Retrieved from: http://en-co.wika.de/newscontentgeneric_ms.WIKA?AxID=458; Wika; Apr. 7, 2014.

METHODS AND SYSTEMS FOR LIFTING, LEVELING AND LOADING MATERIAL INTO A CONTAINER

CROSS-REFERENCE TO RELATED APPLICATIONS

This application is a continuation of U.S. Nonprovisional application Ser. No. 16/373,202, filed Apr. 2, 2019, which claims priority to U.S. Provisional Application Ser. No. 62/651,672, filed Apr. 2, 2018, each of which is incorporated herein by reference in their entirety.

BACKGROUND

A typical overhead material handling system is configured to both deposit and distribute flowable material into an open-topped container. Flowable material, such as waste, scrap pieces, biomaterial, and other loose material, is commonly loaded into containers for shipment. One issue with loading such material into an open-topped container is that the material piles up, forming mounds within the container and resulting in containers that are only partially filled.

A leveler is typically used to aid in the even distribution of the material as the material is being deposited or loaded into the container, which can be quite long in length. Sonic overhead material handling systems include a support structure to support and lift the leveler for ease of removal of the container.

After a container has been filled with the desired amount of material, the container may be removed from under the overhead handling system and transported.

SUMMARY

In accordance with the present invention, an overhead material handling system is provided. In one embodiment, the material handling system includes a leveler having a screw and a hydraulic lift structure comprising a plurality of hydraulic stabilizing legs, the lift structure being connected to the leveler and configured to move the leveler from a first position to a second position.

In one example embodiment, the hydraulic stabilizing legs comprise telescoping legs. The telescoping legs are configured to extend and retract, and when the telescoping legs are fully extended, the leveler is in the second position. In the first position, the telescoping legs are at least partially retracted. The telescoping legs may extend to a position between the fully extended position and the at least partially retracted position, resulting in the leveler being in a third position. The third position may be set at any of a number of locations between the first and the second positions.

In some example embodiments, one or more sensors are present which detect position information concerning one or both of the leveler and the container. The sensor is configured to transmit the location information to a computing device.

In another embodiment, an overhead material handling system is provided that comprises a leveler having a cover defining an interior and a screw having a shaft and a screw portion positioned within the cover interior. The system further comprises a hydraulic lift structure comprising a plurality of hydraulic stabilizing legs, the lift structure being connected to the leveler. The plurality of hydraulic legs extend and retract to raise and lower the lift structure. The system further comprises at least one sensor, a conveyer for placement of a vehicle or container, and a safety mechanism having at least one extension off of an end of part of the leveler apparatus or conveyor.

In a further embodiment, a method is provided for loading and evenly distributing material into a container using an overhead material handling system. The method includes extending a plurality of hydraulic stabilizing legs to raise a lift structure from a first position to a second position, and moving a conveyor to position a container located thereon underneath a leveler that is connected to the lift structure. The method further comprises detecting, via at least one sensor, that the container is in a desired position, retracting the plurality of hydraulic stabilizing legs to lower the lift structure from the second position to a third position, and expelling material into an inlet extending through a cover of the leveler. The material received through the inlet is then driven along the length of the screw of the leveler.

BRIEF DESCRIPTION OF THE FIGURES

FIG. 1B depicts the example material handling system of FIG. 1A in a raised second position, in accordance with at least one embodiment.

DETAILED DESCRIPTION

1. Overview

Figure 1A:
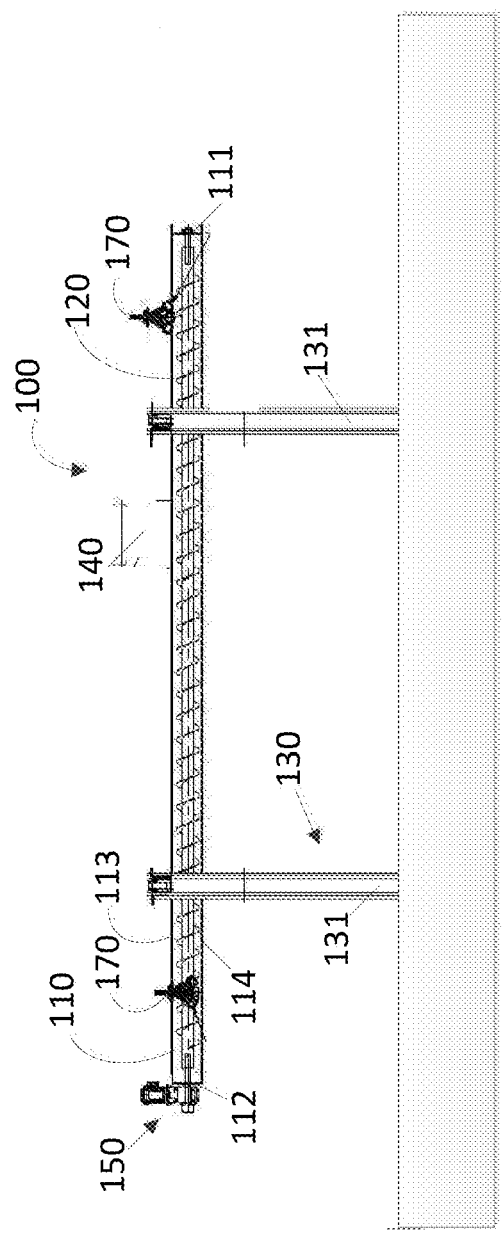
FIG. 1A depicts a schematic of an example material handling system, in accordance with at least one embodiment.

The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed are methods and systems for lifting and leveling an overhead material handling system. In the present disclosure, a support structure comprising stabilizing legs both lifts and supports a screw, facilitating placement and retention of the screw over an open-top container.

As used herein, a "material handling system" is designed to be used with any type of material capable of being deposited into an open-top container. For example, the material may be any flowable (e.g., loose) material. In some examples, the material may comprise scrap pieces. In other examples, the material may be a biomaterial such as sludge or dirt. In other examples, the material may comprise wastewater screenings. Still other flowable materials may be used with the material handling system.

The material handling system is capable of vertically lifting, via a plurality of legs, a screw from a first, low position to a second, high position, to allow for a container (for example, an open-top container on a truck) to be positioned under the screw. After the container is in a desired position to receive material, the screw may be lowered to a third position, wherein the third position could be located at any position between the second and the first position. Material may then be delivered into the container. In some embodiments, the screw may remain in the second position and not be lowered to a third position for delivery of material into the container.

The present disclosure allows for greater ease in positioning a container under a screw for delivery of material into the container. As used herein, a "container" may be any open-top container, and may include wheels and a hitch at either end to facilitate transportation on and off of a roll-off container truck or another vehicle. The container may include sidewalls and a bottom that define an interior, wherein the interior is an upwardly open space.

A roll-off container truck may be any standard roll-off container truck known in the art. In an alternative example, the truck may comprise a vehicle towing a bed on which the container may be loaded. Still other alternative examples may be envisioned.

In one example embodiment, vehicles holding open-top containers may be driven in an assembly-line manner one after another under the system, wherein the vertical lift system moves up and down to accommodate positioning and retention of the screw overhead the containers on the vehicles. The present disclosure further provides various positioning and safety features to facilitate a safe and efficient process for delivery of material into containers.

2. Examples

An exemplary embodiment provides a material handling system that allows for the even distribution and increased fill percent of a container, without the need for personnel to manually even out the distribution of the material.

FIG. 1A depicts a schematic, cross-sectional view of an example material handling system 100, in accordance with at least one embodiment. As shown in FIG. 1A, material handling system 100 is in a lower, first position. The system 100 comprises a cover 110 and a screw 120 located within the cover 110, and a hydraulic system 130.

The cover 110 includes a first end 111, a second end 112, a top surface 113, an interior surface opposite the top surface, and a bottom edge 114. The screw 120 is positioned within the cover 110, under the interior surface of the cover. In some embodiments, the cover 110 comprises a fabric coated polyvinyl chloride (pvc), yet in other embodiments the cover 110 may be made from metal, for example a steel, such as stainless steel. Other materials for the cover 110 are also possible. The cover 110 provides for pest control and prevents exposure of material within a container (shown in FIG. 2) to the exterior environment, and the shape of the top surface 113 of the cover may be flat, peaked, domed, for example. The cover 110 also serves as a barrier from the afore-mentioned exposure, thus increasing the safety of the personnel operating the handling system 100. The combination of the material used and size for the cover result in the cover being a heavy component. Furthermore, the material (typically a metal) and size for the screw 120 add to the weight of the components that needs to be lifted and supported when in a raised position.

The cover 110 also includes at least one inlet 140 through which material may flow. The inlet 140 may be an opening, orifice, port, or open chute through the cover 140. In the example embodiment of FIG. 1A, the inlet 140 is located near the middle of the cover, but may be positioned near either of the first end 111 or the second end 112 in other embodiments. Material may be sent through the inlet 140 from a feeder system (not shown). The feeder system may include a number of types of conveyors or feeder pipes known in the art to move any of the material types discussed herein.

The screw 120 receives material through the inlet 140 and advances that material via rotation of a spiral flange or protrusion on the screw 120 into the container. A drive unit includes a motor and gear reducer in communication with the screw to generate the necessary force to advance material around the screw 120 and into the container. The horse power of the motor may vary depending on the type of materials required to be advanced through the material handling system 100.

In some embodiments, the screw 120 may not include a cover. In such an embodiment, the hydraulic system 130 serves to lift the screw 120. The screw 120 may be a shafted, or shaft-mounted screw, or the screw 120 may be shaftless. If the screw is shaft-mounted, bearings may be utilized at each end of the shaft. The screw is a spiral flange, preferably in the range from 4 inches to 16 inches in diameter, adapted to move material in a particular direction as the screw 120 is rotated by the drive-unit. In operation, the screw 120 agitates and advances material forward as one end of a container fills with a pile of material, but the screw 120 may also operate in reverse if the material backs-up.

A drive mechanism 150, such as a motor, for rotating the screw 120, is operably connected to the screw 120.

Figure 4:
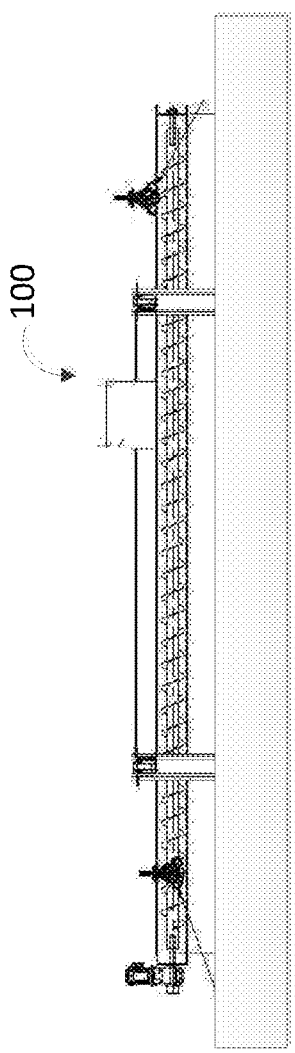
FIG. 4 depicts a maintenance mode for the material handling system of FIGS. 1A-1B, in accordance with at least one embodiment.

The hydraulic system 130 includes a plurality of legs 131 positioned on or affixed to the ground, which are configured to extend vertically upwards, such as to the first position shown in FIG. 1A. The plurality of legs 131 can be raised and lowered from a position low to the ground, in maintenance mode as shown in FIG. 4, to the first position shown in FIG. 1A to a second, raised position shown in FIG. 1B, or to one or more intermediate positions that could be located anywhere between the first position and the second position.

In one embodiment, each of the plurality of legs 131 comprises a telescopic hydraulic cylinder, having a main cylinder barrel and stages. Within the barrel are pistons and piston rods. The difference in pressure between the two sides of a piston causes the cylinder to extend and retract. The main barrel moves first, completing its stroke before the next stage begins to move, and so forth until the smallest-diameter stage is fully extended to achieve the second position. Conversely, when retracting, the smallest-diameter stage retracts fully before the next stage begins to move, until the stages are nested into the main barrel. The collapsed length of the telescopic hydraulic cylinder comprising one of the legs 131 may comprise about 20% to 40% of its extended length, in one example embodiment. The hydraulic system 130 may be a double-acting system, wherein the plurality of legs 130 are powered hydraulically in both directions, or a single-acting system.

In some embodiments, the hydraulic system 130 may be supported by an overhead support system.

The material handling system 100 may also feature inspection ports and one or more sensors 170. The one or more sensors 170 may be positioned in or on the cover 110, the hydraulic system 130, or the screw 120, serving to detect positional information regarding the screw system, the container, or the relationship between these components. For example, the one or more sensors 170 may be configured to obtain data concerning the location of the screw 120 and then transmit the data to a remote or wired computing device. The computing device may comprise a display to show the location data for the screw. In other embodiments, the computing device issues, via an audio or visual alarm, an indication that the container is not to be moved until the screw is lifted in an appropriate position. The sensors may serve to aid in the placement of the screw 120 above the container and substantially parallel to the container, or to inspect a mechanical failure and/or the contents of the container.

Radar or other sensing devices, such as lasers or photo-electric devices, may also be used to determine a level of material within a container: for example, to determine when container is near capacity with material, or full of material, or may be used to determine a position of various equipment components or position of a container or vehicle relative to the leveler.

FIG. 1B depicts the example material handling system 100 in a raised second position, in accordance with at least one embodiment. In FIG. 1B, the plurality of legs 131 have extended to the second position. The height of the screw 120 in the second position is of a height sufficient to permit a container to be positioned underneath.

Figure 2:
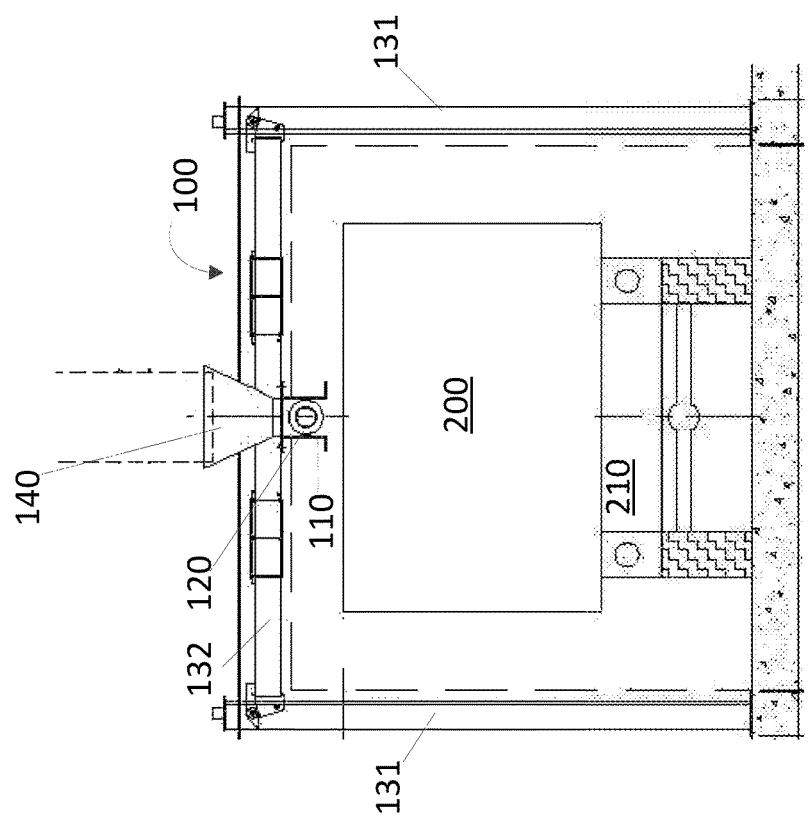
FIG. 2 depicts a rear view of the material handling system of FIG. 1A, in accordance with at least one embodiment.

FIG. 2 depicts a rear view of the material handling system of FIGS. 1A-B, in accordance with at least one embodiment. In FIG. 2, the overhead screw 120 is in the raised, second position depicted in FIG. 1B. An open-top container 200 is shown on a container truck 210 which has been driven through and under the system 100. The container may be placed under a conveyor, and once the container is in a desired position under the screw system, the hydraulic legs may be lowered toward the first position, until the screw system hovers at a desired level above the container. Material may then be fed from a feeder through the inlet 140, and directed around the screw to then fall through the bottomless trough into the container. Once the material has filled a first area within the container, located closest to and under the inlet 140, the deposited material forms a pile that supports additional material against the screw 120. The rotating screw 120 thus serves to incrementally fill the container, ensuring that the container is filled to capacity and the material deposited is generally evenly distributed within the container.

In operation, the steps of the method are repeated until the container is substantially full. When the container is filled with the desired amount of material or to capacity (this can be determined by using the inspection ports previously discussed, by using sensor technology or other alternative means), the flow of material is stopped and the cover and/or screw 120 is lifted using the hydraulic system 130, and the vehicle comprising the container is moved. Another container may then be placed under the material handling system 100, and the legs 131 of the hydraulic system 130 then lower into position the cover and/or screw to again deposit material into the container. Also shown in FIG. 2 is an example of an additional support structure beam 132 that may support the hydraulic system 130.

Figure 3:
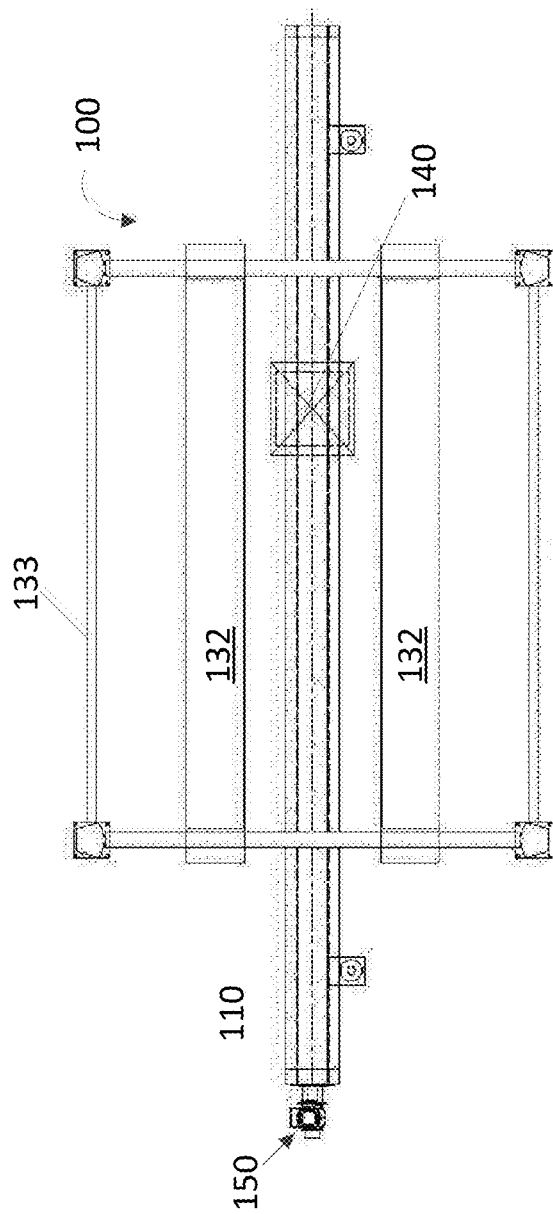
FIG. 3 depicts a top view of the material handling system of FIG. 1A, in accordance with at least one embodiment.

FIG. 3 depicts a top view of the system 100 of FIGS. 1A-1B. Examples of additional support structure beams 132 and 133 are shown in this overhead view.

FIG. 4 depicts a maintenance mode feature, wherein the screw system may be lowered until it is close to the ground to perform maintenance and inspections, serving to prevent injury to personnel and equipment. This mode may be a safety feature option. In some embodiments, the maintenance mode position is lower than the first position and the hydraulic legs 131 are fully retracted.

Figure 5:
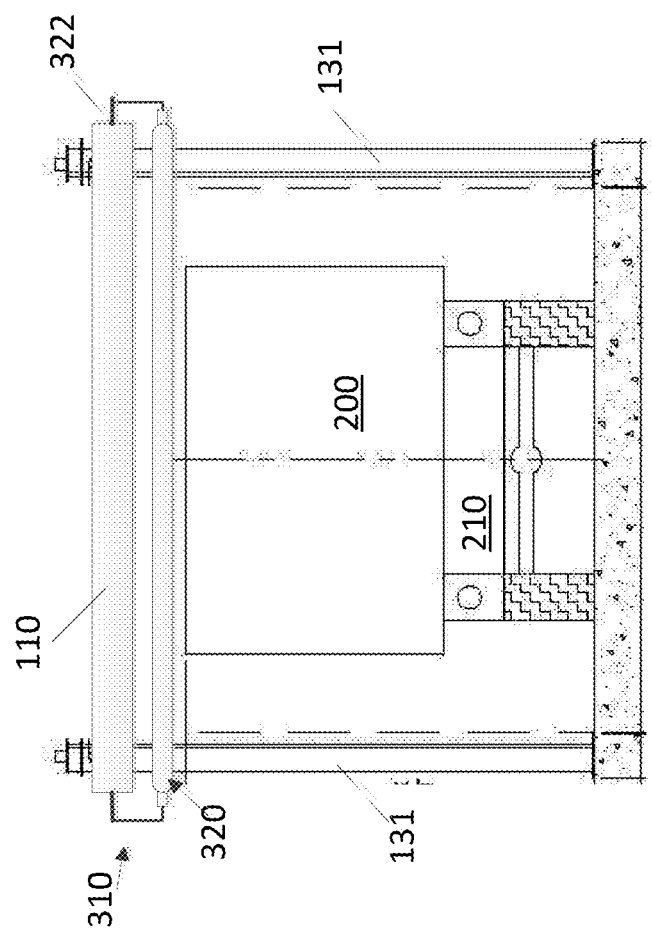
FIG. 5 depicts a schematic of an example safety feature for a material handling system, in accordance with at least one embodiment.

FIG. 5 depicts a schematic of an example safety feature 300 for a material handling system, in accordance with at least one embodiment. The example safety feature comprises an extension 310 that may be positioned at one or both ends of a cover or conveyor. A vehicle holding a container is driven and positioned under a raised leveling apparatus, such as the apparatus 100 described above. The extension 310 may take the form of a roller assembly 320 which may be attached to or integral with an end 322. The roller assembly may comprise one or more spring-loaded rollers or wheels, in some embodiments. The rollers reduce friction and pulling force when contact is achieved with a container or vehicle. In another embodiment, a frame comprising a plurality of wheels or rollers in an in-line configuration may be present. In yet other embodiments, a conveyor belt idler mechanism may be used. In one alternative embodiment, two elongated extensions, such as a ski structure, may form the safety feature instead of a roller assembly. Once the vehicle is positioned under the leveler, if the vehicle comprising the container attempts to move past the end 322 when the screw system remains in the lowered position, the container will make contact with the roller assembly 320. The roller or rollers of the roller assembly 320 will then rotate to push the container away from the end 322 and fall back into position under the leveling apparatus. The extension 310 is thus a safety feature that prevents a container from moving too far away from the screw system when the screw system is in a lowered position. This safety feature prevents both continued operation of the screw system and delivery of material without any container underneath to receive the material, as well as possible collision of an edge of the container with the screw system, which could damage either component.

Figure 6:
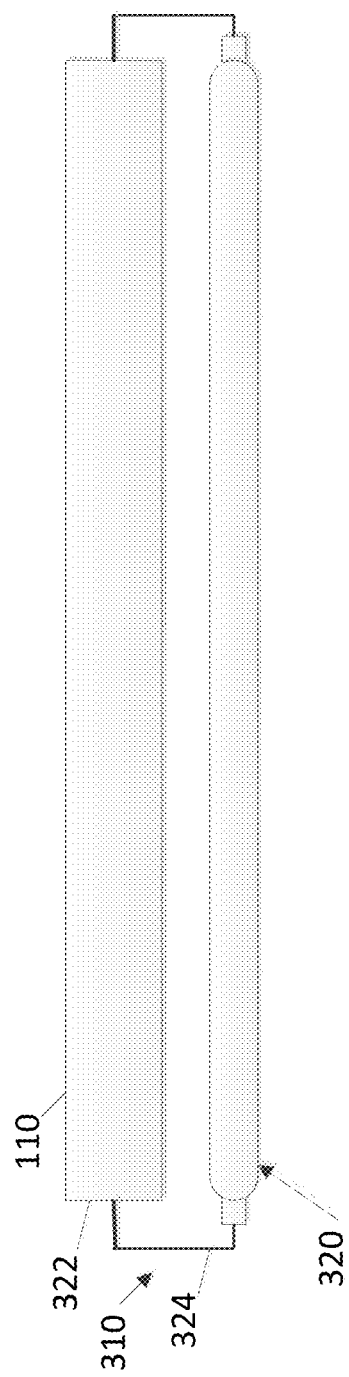
FIG. 6 depicts the roller assembly of FIG. 5, in accordance with at least one embodiment.

FIG. 6 depicts the roller assembly 320 of FIG. 5. One or more rollers 323 are shown attached to an extension structure 324.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method for loading and evenly distributing material into a container using an overhead material handling system, wherein the system comprises a leveler comprising an inlet and a screw; a hydraulic lift structure comprising a plurality of stabilizing legs, the lift structure being connected to the leveler and configured to move the leveler from a first position to a second position; and a conveyor positioned under the screw and configured for a container to be placed upon, the method comprising:
    positioning the container underneath the leveler;
    expelling material into the inlet of the leveler; and
    driving the material received through the inlet along the length of the screw to ensure even distribution in the container.

2. The method of claim 1 further comprising extending the plurality of stabilizing legs to raise the lift structure from the first position to the second position.

3. The method of claim 1, wherein the plurality of stabilizing legs comprises hydraulic powered telescoping legs.

4. The method of claim 3, wherein the telescoping legs are configured to extend and retract, and wherein when the telescoping legs are fully extended, the leveler is in the second position.

5. The method of claim 4, wherein in the first position the telescoping legs are at least partially retracted.

6. The method of claim 5, wherein the telescoping legs extend to a position between the fully extended position and the at least partially retracted position, resulting in the leveler being in a third position.

7. The method of claim 3, wherein the leveler is in a fourth position when the telescoping legs are fully retracted.

8. The method of claim 1, further comprising detecting a location of the container to ensure that the container is in a desired position via a sensor positioned on the leveler, the hydraulic lift structure, or both the leveler and the hydraulic lift structure.

9. The method of claim 8, further comprising transmitting the location information to a computing device.

10. The method of claim 8, further comprising activating a safety structure in response to location information during receipt of the material into the container, wherein the safety structure extends from the conveyor and comprises a first extension and a second extension.

11. The method of claim 10, wherein the first extension and the second extension are sized and shaped to receive the container.

12. A method for loading and evenly distributing material into a container using an overhead material handling system, the method comprising:

positioning the container underneath a leveler of the overhead material handling system, the system further comprising a hydraulic lift structure comprising a plurality of hydraulic stabilizing legs, the lift structure being connected to the leveler and configured to move the leveler from a first position to a second position;

expelling material into an inlet of the leveler; and driving, via a motor of the leveler, the material received through the inlet along the length of the screw to ensure even distribution in the container.

13. The method of claim 12, further comprising extending the plurality of hydraulic stabilizing legs to raise the hydraulic lift structure from a first position to a second position prior to positioning the container.

14. The method of claim 12, wherein positioning the container comprises moving a conveyor of the overhead material handling system to position the container located thereon underneath the leveler.

15. The method of claim 12, further comprising detecting, via at least one sensor, that the container is in a desired position.

16. The method of claim 15, activating a safety mechanism comprising at least one extension off of an end of the leveler in response to detecting that the container is in the desired position.

17. The method of claim 12, further comprising retracting the plurality of hydraulic stabilizing legs to lower the hydraulic lift structure from the second position to a third position prior to expelling the material.

* * * * *